(12) United States Patent
Tskitishvili et al.

(10) Patent No.: US 9,552,450 B2
(45) Date of Patent: Jan. 24, 2017

(54) DETERMINING A USER-SPECIFIED LOCATION IN A GRAPHICAL USER INTERFACE OF AN ELECTRONIC DESIGN AUTOMATION TOOL

(71) Applicant: Synopsys, Inc., Mountain View, CA (US)

(72) Inventors: Karlo V. Tskitishvili, Santa Clara, CA (US); David L. Peart, Round Rock, TX (US); Luis D. Guilin, Livermore, CA (US); Jeffrey J. Loescher, Portland, OR (US)

(73) Assignee: SYNOPSYS, INC., Mountain View, CA (US)

( * ) Notice: Subject to any disclaimer, the term of this patent is extended or adjusted under 35 U.S.C. 154(b) by 47 days.

(21) Appl. No.: 14/723,354

(22) Filed: May 27, 2015

(65) Prior Publication Data
US 2015/0254388 A1    Sep. 10, 2015

Related U.S. Application Data

(62) Division of application No. 14/509,765, filed on Oct. 8, 2014, now Pat. No. 9,064,082, which is a division of application No. 13/728,873, filed on Dec. 27, 2012, now Pat. No. 8,893,073.

(51) Int. Cl.
*G06F 17/50* (2006.01)
(52) U.S. Cl.
CPC ....... *G06F 17/5072* (2013.01); *G06F 17/5045* (2013.01); *G06F 17/5077* (2013.01); *G06F 17/5081* (2013.01); *G06F 17/5068* (2013.01); *G06F 2217/06* (2013.01); *G06F 2217/74* (2013.01)

(58) Field of Classification Search
CPC .............. G06F 17/5045; G06F 17/5068; G06F 17/5081; G06F 17/5072; G06F 17/5077; G06F 2217/06; G06F 2217/74
USPC ............................ 716/102, 139, 111; 703/14
See application file for complete search history.

(56) References Cited

U.S. PATENT DOCUMENTS

| 5,745,111 | A  | * | 4/1998 | Cline | ................... | G06F 3/0481 |
| | | | | | | 715/769 |
| 7,546,176 | B2 | * | 6/2009 | Botvinnik | ........... | G06F 17/5004 |
| | | | | | | 244/1 R |
| 8,893,073 | B2 | * | 11/2014 | Rashingkar | ......... | G06F 17/5077 |
| | | | | | | 703/15 |

(Continued)

*Primary Examiner* — Phallaka Kik
(74) *Attorney, Agent, or Firm* — Park, Vaughan, Fleming & Dowler LLP; Laxman Sahasrabuddhe

(57) ABSTRACT

Methods and apparatuses are described for creating, editing, and viewing a floorplan of a circuit design. Specifically, some embodiments enable a user to perform a graphical operation at an inference point in a circuit design layout, wherein the location of the inference point is determined based on existing graphical objects in the circuit design layout. Some embodiments substantially instantaneously update a congestion indicator in _a circuit design layout in response to modifying the circuit design layout. Some embodiments substantially instantaneously update pin locations of a block or partition in response to changing the size or shape of the block or partition. Some embodiments enable a user to view a circuit design layout based on the logical hierarchy, and also based on at least one additional attribute type such as voltage, power, or clock domain.

18 Claims, 12 Drawing Sheets

(56) References Cited

U.S. PATENT DOCUMENTS

| | | | |
|---|---|---|---|
| 9,064,082 B2* | 6/2015 | Yu ..................... | G06F 17/5077 |
| 2007/0040928 A1* | 2/2007 | Jung ................... | H04N 1/2166 |
| | | | 348/362 |
| 2010/0179005 A1* | 7/2010 | Meadows ............. | A63B 57/00 |
| | | | 473/407 |

* cited by examiner

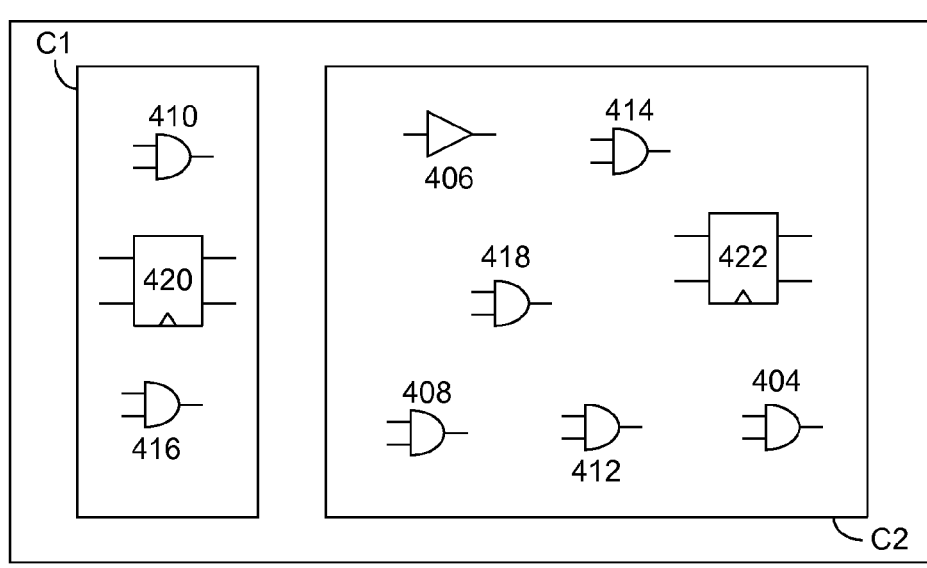

FIG. 4C

Display a first view of a circuit design in the GUI, wherein the first view groups circuit elements into hierarchical blocks in accordance with a logical hierarchy of the circuit design, and wherein at least some circuit elements in the circuit design are associated with one or more attribute values corresponding to one or more attribute types
452

Responsive to receiving a request to display the circuit design based on an attribute type, generate a second view of the circuit design, wherein the second view groups circuit elements into blocks that have the same attribute value for the attribute type
454

Display the second view of the circuit design in the GUI
456

FIG. 4D

DETERMINING A USER-SPECIFIED LOCATION IN A GRAPHICAL USER INTERFACE OF AN ELECTRONIC DESIGN AUTOMATION TOOL

RELATED APPLICATION

This application is a divisional of, and claims priority to, U.S. application Ser. No. 14/509,765, now U.S. Pat. No. 9,064,082, filed on 8 Oct. 2014, the contents of which are herein incorporated by reference in their entirety for all purposes. U.S. application Ser. No. 14/509,765 is a divisional of, and claims priority to, U.S. application Ser. No. 13/728,873 (U.S. Pat. No. 8,893,073), filed on 27 Dec. 2012, the contents of which are herein incorporated by reference in their entirety for all purposes.

BACKGROUND

Technical Field

This disclosure relates to electronic design automation (EDA). More specifically, this disclosure relates to a graphical user interface (GUI) for a floor-planning tool for EDA.

Related Art

Integrated circuit (IC) design involves the use of schematics that visually represent components and wires of the IC. In EDA, a floorplan typically refers to a schematic that provides at least the tentative sizes and tentative locations of the major functional blocks in an IC.

A floorplanning tool can be used to create, edit, and view a floorplan for an IC. Decisions that a circuit designer makes while creating a floorplan can have a substantial impact on subsequent EDA stages. What are needed are user-friendly floorplanning tools that enable a circuit designer to create floorplans that reduce the overall circuit design time and/or improve the overall quality of results (QoR).

SUMMARY

Some embodiments described herein provide systems and techniques for creating, editing, and viewing a floorplan of a circuit design. Some embodiments enable a user to perform a graphical operation at an inference point. An embodiment (e.g., a GUI) can receive a first user input, wherein the first user input selects a first point associated with a first graphical object in a circuit design layout to be a first inference point. Next, the embodiment can receive a second user input, wherein the second user input selects a second point associated with a second graphical object in the circuit design layout to be a second inference point. The embodiment can then display a third inference point in the circuit design layout, wherein the third inference point is located at an intersection of a first line that extends from the first inference point and a second line that extends from the second inference point. Next, the embodiment can receive a third user input, wherein the third user input selects the third inference point in the circuit design layout. The embodiment can then perform the operation in the circuit design layout based on the third inference point. In some embodiments, the operation can be performed at an offset from the third inference point. Specifically, prior to performing the operation, a fourth user input can be received that specifies the offset from the third inference point where the operation is desired to be performed.

Some embodiments described herein provide systems and techniques for displaying a congestion indicator for a channel in a circuit design layout. Specifically, an embodiment can display (e.g., in a GUI of a computer) the congestion indicator for the channel, wherein the congestion indicator is determined based on performing a congestion analysis on the circuit design layout (e.g., by performing global routing on the entire circuit design layout, and then determining the congestion indicator for the channel based on the global routing solution). Next, the embodiment can modify the circuit design layout based on user input to obtain a modified circuit design layout, wherein said modifying changes a width of the channel to a new width value. The embodiment can then determine an updated capacity value for the channel based on the new width value, wherein the updated capacity value corresponds to an amount of available routing resources in the channel. Next, the embodiment can determine an updated congestion indicator based on the updated capacity value without performing congestion analysis on the modified circuit design layout (e.g., without performing global routing on the entire modified circuit design layout). Finally, the embodiment can display (e.g., in the GUI of the computer) the updated congestion indicator for the channel. In some embodiments, displaying the updated congestion indicator comprises: displaying a demand value that corresponds to a number of wires that are expected to be routed through the channel, and displaying the updated capacity value. In some embodiments, displaying the updated congestion indicator comprises: determining an updated color based on the updated capacity value, and displaying a region in the circuit design layout that corresponds to the channel with the updated color.

Some embodiments described herein provide systems and techniques for substantially instantaneously updating pin locations in a GUI, wherein a set of pins are currently located at a first set of pin locations on an edge of a block or partition in a circuit design layout. In this disclosure, the terms "substantially instantaneous" and "substantially instantaneously" refer to an amount of time that is small enough so that a user who uses the GUI feels that the GUI is highly responsive. Specifically, an embodiment can modify the circuit design layout based on user input to obtain a modified circuit design layout. If the edge has increased in length, the embodiment does not change the first set of pin locations in the GUI. Also, if the edge has decreased in length but is long enough to preserve the first set of pin locations, the embodiment does not change the first set of pin locations in the GUI. However, if the edge has decreased in length and is not long enough to preserve the first set of pin locations, the embodiment decreases distances between neighboring signal pins to obtain a second set of pin locations, wherein said decreasing preserves locations of one or more power pins, relative ordering of signal pins, and locations of one or more fixed pins. Once the updated pin locations (i.e., the second set of pin locations) have been determined, the embodiment can display the set of pins at the second set of pin locations in the GUI. Note that the embodiment is able to substantially instantaneously update the pin locations because the embodiment determines the second set of pin locations without performing global routing on the modified circuit design layout. In some embodiments, decreasing distances between neighboring signal pins includes multiplying each distance by a ratio that is computed by dividing a decreased length of the edge by an original length of the edge. In some embodiments, decreasing also includes snapping one or more pins to wire track locations in the circuit design layout. In some embodiments, if two or more pins snapped to the same wire track location, the embodiment can assign a pin location for each of the two or more pins in a different metal layer.

Some embodiments provide systems and techniques for displaying a circuit design based on a user-specified attribute type (e.g., power domain, clock domain, etc.). Circuit elements in the circuit design are associated with one or more attribute values (e.g., power domain or clock domain identifiers) corresponding to one or more attribute types (e.g., power domain or clock domain). Specifically, an embodiment can display a first view of a circuit design in the GUI, wherein the first view groups circuit elements into hierarchical blocks in accordance with a logical hierarchy of the circuit design. Next, responsive to receiving a request to display the circuit design based on an attribute type, the embodiment can generate a second view of the circuit design, wherein the second view groups circuit elements into blocks that have the same attribute value for the attribute type. The embodiment can then display the second view of the circuit design in the GUI. If the attribute type is power domain, then generating the second view includes assigning each circuit element to a block based on the power domain of the circuit element. In this case, the blocks in the second view can have a hierarchical structure that corresponds to a power domain hierarchy. If the attribute type is clock domain, then generating the second view includes assigning each circuit element to a block based on the clock domain of the circuit element.

BRIEF DESCRIPTION OF THE FIGURES

FIG. 4C presents a view based on a clock domain hierarchy in accordance with some embodiments described herein.

FIG. 4D presents a flowchart that illustrates a process for displaying a circuit design in a GUI in accordance with some embodiments described herein.

DETAILED DESCRIPTION

Figure 1A:
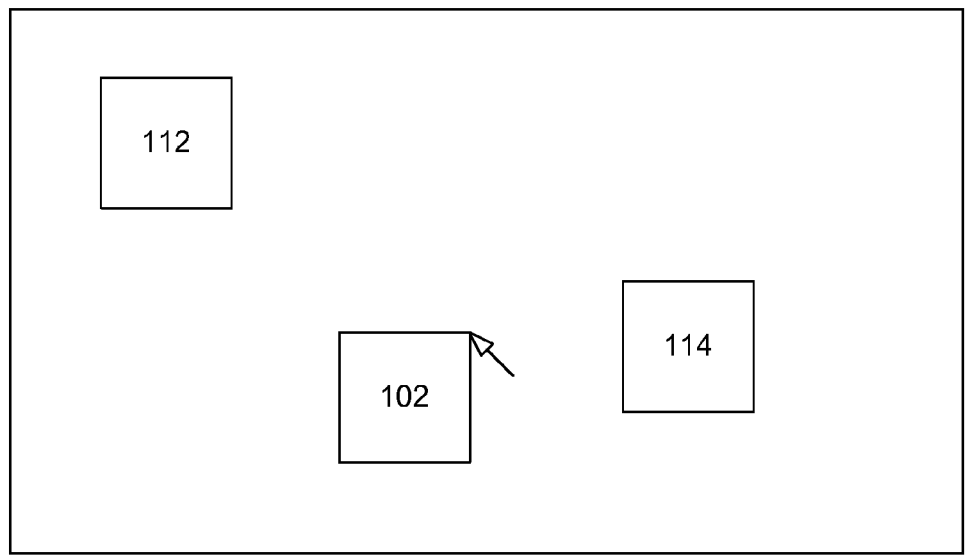
FIGS. 1A-1E illustrate an example of how inference points can be used to place a block in a circuit design layout in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are illustrative purposes only and are not intended to limit the embodiments to the forms disclosed.

Some EDA software tools enable circuit designers to describe the functionality that they want to implement. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for implementation, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and power. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Dynamic Inference Points

Manual creation and editing of layout data is a critical part of the implementation process, and the productivity of designers doing that work is important to design teams. There are large numbers of graphical objects that need to be interactively manipulated and the graphical objects need to be precisely positioned relative to each other. The size of the data involved makes precision a challenge when specifying points using pen/mouse based inputs at zoom levels that provide meaningful context, even with large and multi-monitor environments.

Traditionally, when specifying points for object creation and editing, the user has relied on fixed grids and snapping to objects. However, this doesn't provide the necessary control, where points need to be specified relative to different reference points in each dimension, or with some kind of an offset relative to a reference. User created rulers can be used as guidelines, but this is an additional burden for the user to edit the guidelines as well as the objects they are specifying, impacting productivity. For existing graphical objects, support for traditional one-dimensional align and distribute types of functions are not very efficient when manipulating data in multiple dimensions and are not intuitive to use since both the reference and object to be moved must be selected.

Some embodiments described herein provide a GUI with a user-operated pointing device that facilitates the selection of a coordinate point with a precise offset from existing graphical objects on a display by automatically aligning to dynamic reference points that are inferred from the coordinates of neighboring graphical objects and allowing user specified offsets from the inferred dynamic reference points. These embodiments can significantly increase user productivity and accuracy for floorplan and layout editing tasks.

Note that each graphical object is constructed from a set of edges that have endpoints and midpoints that can potentially be used as a reference when positioning other objects. Inference points provide automatic guidelines to allow aligning the edited objects with these reference points. Intersections of these guidelines are also locations that can be points of reference for operations. By combining these inference points, with the additional ability to specify an offset, the user is provided with very exact control over the relative positions of objects, with a simple and streamlined interface. Furthermore, since typically all of the interactive tools of a layout editor involve the specification of points to create and edit data, this general interaction model can be applied consistently and universally to provide a powerful and easy-to-use environment that can significantly improve the productivity of the circuit designer.

Some embodiments described herein extend the idea of dynamic inference points and guidelines, to also allow offset information to be specified relative to an active inference point (e.g., an active inference point can be a point that was implicitly or explicitly indicated as being active by a user) when entering points for layout editing. These embodiments provide not only fast and easy to use alignment during the construction and editing of objects, but those objects can also be precisely positioned relative to these guide points. These embodiments also provide a general and consistent interface that enables the GUI feature to be applied to all of the layout creation and editing "tools" in the application.

In general, any endpoint (e.g., a vertex of a polygon) or midpoint of an object can be used to infer a reference point for alignment or relative positioning for editing operations. These inferred reference points (which are sometimes referred to as "inference points" in this disclosure) are identified by the user dynamically from within all of the editing and creation tools. Inference points imply dynamic guidelines are being used for alignment and snapping when positioning points or objects. When specifying multiple inference points, these guidelines create an intersection and infer a new inference point at that intersection. As points are specified for a given creation/editing operation, those points are also treated as inference points.

FIGS. 1A-1E illustrate an example of how inference points can be used to place a block in a circuit design layout in accordance with some embodiments described herein. Graphical object 102 (which can correspond to a circuit block in a logical hierarchy) is being moved using its upper right corner as the reference point for the move. User can use a pointer as shown in FIG. 1A to select the upper right corner to indicate that the upper right corner is the reference point for the move. Suppose the user wants to place graphical object 102 at a location that is aligned with the bottom right corner of graphical object 112 and the top left corner of graphical object 114. The user can perform this operation using embodiments described herein as follows.

Figure 1B:
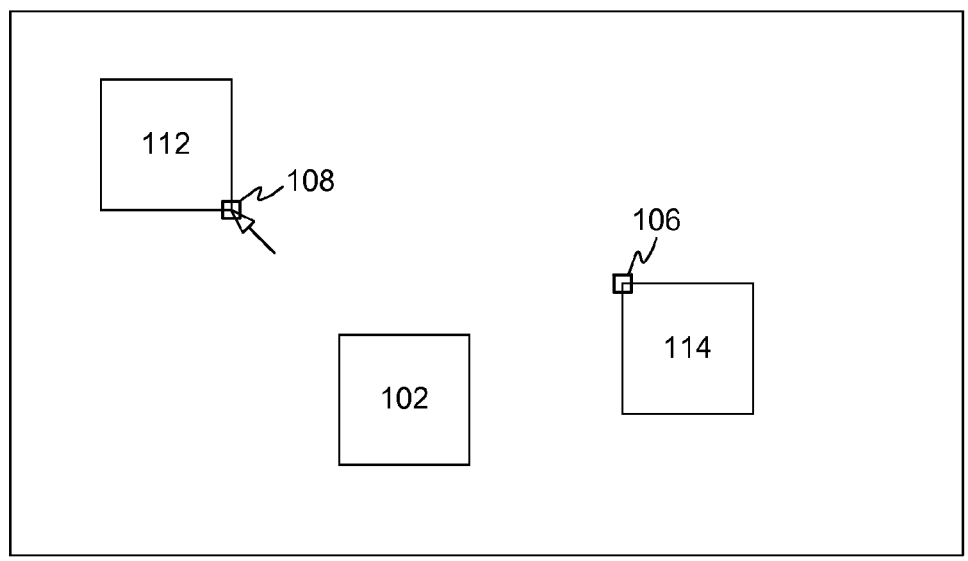

First, the user can select the inference points corresponding to the top left corner of graphical object 114 and the bottom right corner of graphical object 112 by using the pointer. For example, when the user moves the pointer in proximity to an inference point and provides a selection input (e.g., by clicking the left button on a mouse), the GUI can place a visual indicator (e.g., a square) at the inference point to indicate that the inference point has been selected for the current GUI operation. FIG. 1B shows the display after the user has selected the inference points that are shown using two hollow squares 106 and 108.

Figure 1C:
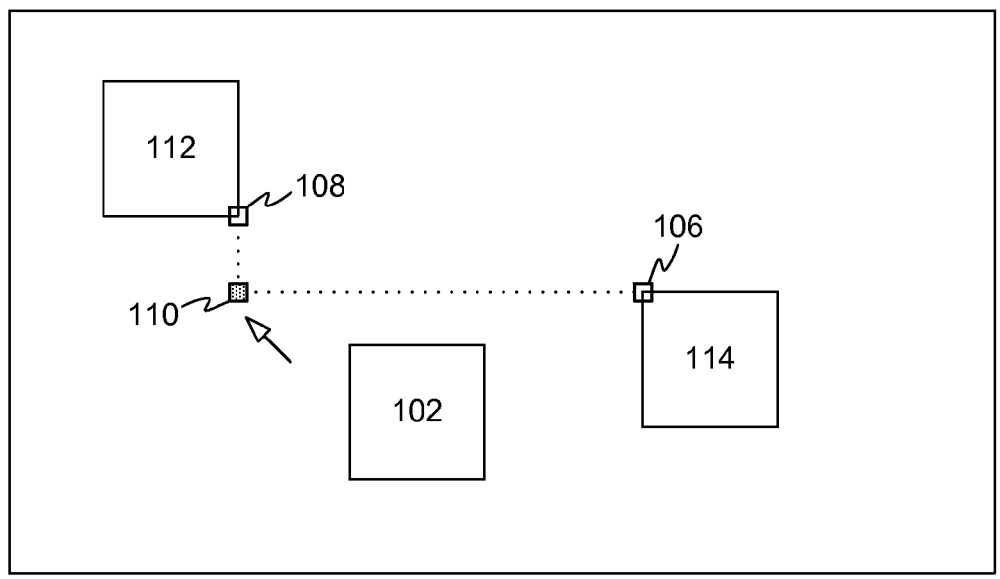

Next, the user can move the pointer to a location that is in proximity to a point that is aligned with the top left corner of graphical object 114 and the bottom right corner of graphical object 112. When the pointer is in proximity to this point, the GUI can display dotted lines that extend from the inference points (i.e., from squares 106 and 108) and intersect at an inference point shown by shaded square 110 in FIG. 1C. The intersection of the dotted lines is an active inference point (an active inference point is an inference point that can be used to perform a GUI operation, e.g., to move block 102 to that point) and this fact can be depicted by visually highlighting the inference point (e.g., by shading the square 110 as shown in FIG. 1C).

Figure 1D:
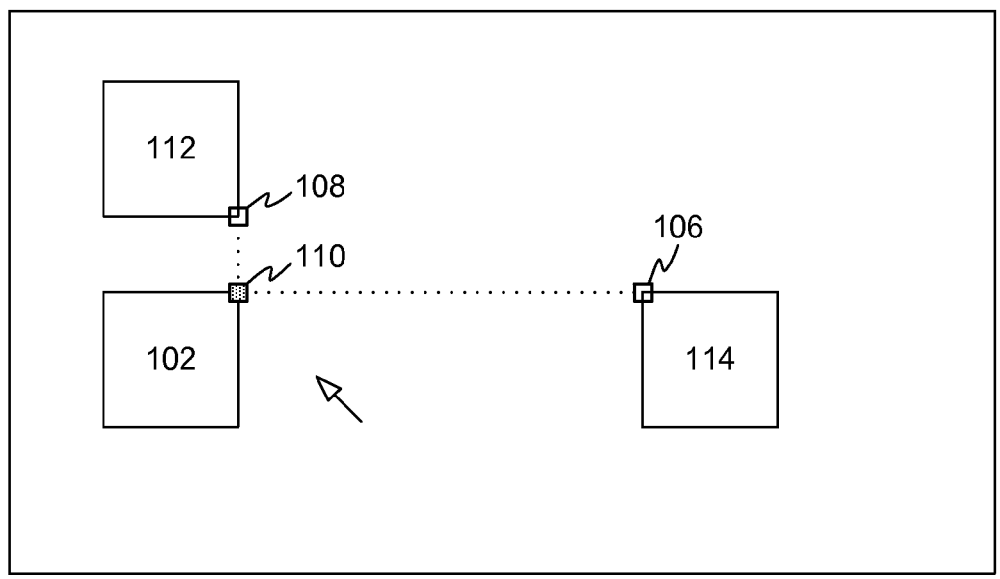
Figure 1E:
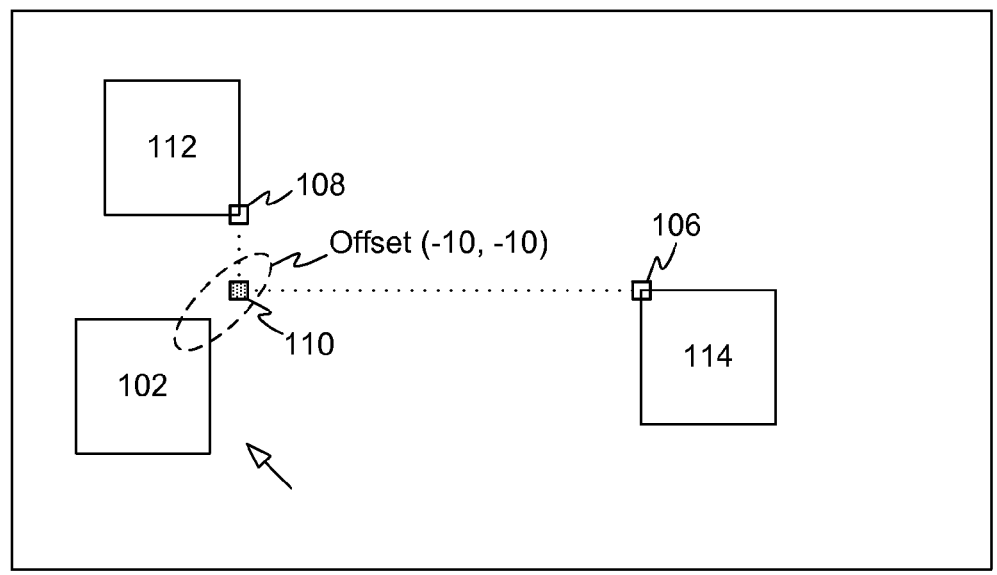

The user can directly use the active inference point to position graphical object 102 or has the option to enter an offset with respect to the active inference point (for example, the GUI may present a pop-up window with a text input field to enable the user to enter the offset, or the GUI may have a permanent text input field in which the user can specify the offset). FIG. 1D illustrates the result when the user directly uses the active inference point to position graphical object 102 (note that the top right corner of graphical object 102 that was selected in FIG. 1A as the reference point for the move is now located at active inference point 110). FIG. 1E illustrates the result when the user specified an offset of (−10, −10), and placed graphical object 102 at that offset. The first number in the offset tuple indicates the offset (e.g., in a length unit, as a number of pixels, etc.) along a first dimension, e.g., the X-axis, and the second number in the offset indicates the offset (e.g., in a length unit, as a number of pixels, etc.) along a second dimension, e.g., the Y-axis.

Inference points can generally be used to perform any GUI operation. For example, inference points can be used to draw a polygon. Specifically, while drawing a polygon, the vertices in the polygon that the user has already created can be used to extend guidelines whose intersections can then be used as inference points where the next vertex of the polygon can be created. As another example, inference points can be used to create a rectangular block that is larger or smaller than an existing rectangular block by a precise amount. Suppose a rectangular block with dimensions 113× 217 (in some length unit, e.g., nm) exists in the layout, and a rectangular block with dimensions 123×227 is desired to be created in the layout that surrounds the existing rectangular block. Some embodiments described herein can be used to perform this operation easily. The user can select the top left corner of the existing rectangular block as an inference point and provide an offset of (−10, 10) to create another inference point P1. Next, the user can select the bottom right corner of the existing rectangular block as an inference point and provide an offset of (10, −10) to create yet another inference point P2. The user can then create the desired rectangular block using inference points P1 and P2.

Figure 1F:
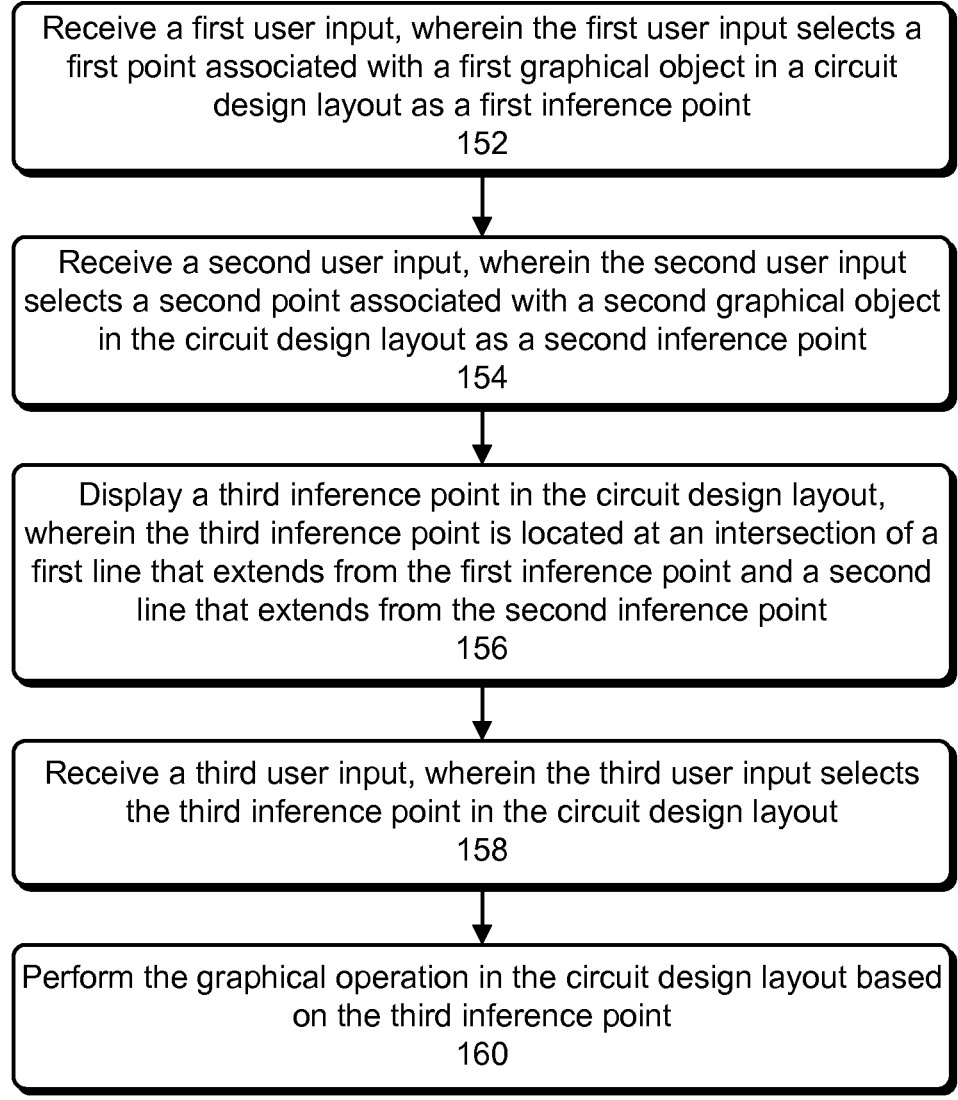
FIG. 1F presents a flowchart that illustrates a process for performing a graphical operation in a GUI of a floorplanning tool in accordance with some embodiments described herein.

FIG. 1F presents a flowchart that illustrates a process for performing a graphical operation in a GUI of a floorplanning tool in accordance with some embodiments described herein. The process begins with receiving a first user input (e.g., via a pointer of a GUI), wherein the first user input selects a first point associated with a first graphical (e.g., a first vertex of a first polygon) in a circuit design layout to be a first inference point (operation 152). Next, a second user input is received (e.g., via the pointer of the GUI), wherein the second user input selects a second point associated with a second graphical object (e.g., a second vertex of a second polygon) in the circuit design layout to be a second inference point (operation 154). The GUI can then display a third inference point (e.g., the inference point corresponding to square 110) in the circuit design layout, wherein the third inference point is located at an intersection of a first line that extends from the first inference point and a second line that extends from the second inference point (operation 156). Next, a third user input is received (e.g., via the pointer of the GUI), wherein the third user input selects the third inference point in the circuit design layout (operation 158). The GUI can then perform the graphical operation in the circuit design layout based on the third inference point (operation 160). Specifically, the graphical operation can be performed at the third inference point or at an offset from the third inference point. In the latter case, the process can receive (prior to performing the graphical operation) a fourth user input that specifies the offset.

Once an inference point has been created, it can be used as the basis for creating other inference points. For example, suppose inference point P1 is created at the intersection of guidelines that extend from polygon vertices V1 and V2. Now, inference point P2 can be created at the intersection of guidelines that extend from inference point P1 and a third polygon vertex V3. In addition, inference point P3 can be created at the intersection of polygon vertices V4 and V5, and a fourth inference point P4 may be created at the intersection of guidelines that extend from inference point P1 and P3.

Embodiments described herein have the following advantages: (1) the embodiments allow editing at a very high zoom level while still providing a high degree of precision, (2) the embodiments streamline and simplify the interface by providing a powerful and easy to use mechanism for controlling relative positioning when specifying points in the editor, (3) the embodiments improve customer productivity by embedding automatic support for alignment and relative positioning in all of the editing functions, without requiring additional clicks or the use of multiple editing tools in the application, and (4) the embodiments can be used with any interactive editing of 2D or 3D data where relative positioning is important.

What-if Congestion

Routing an IC involves determining routes for metal wires which electrically connect integrated circuit devices to produce circuits that perform desired functions. Large-scale IC chips are typically routed using routing software, which is typically referred to as a "routing system" or "router."

A routing process typically has three stages: global routing, track assignment, and detailed routing. However, the number of stages in the process can be more or less than three. In the global routing stage, the system does not create detailed routing shapes for the wires. Instead, the system determines the topologies of multi-pin nets and areas that the nets should go through to minimize routing congestion and minimize the overall wire length. Routing congestion occurs in a region of the circuit design when the routing resources (e.g., number of wire tracks) are insufficient to satisfy the routing demand for the region (e.g., the number of wires that need to be routed through the region). In the track assignment stage, the system refines the global routing plan by assigning wires to tracks. Note that, although the track assignment may generate detailed routes for the wires, the routing solution at this stage may not satisfy all of the design rules because this stage typically uses a simpler routing model than the next stage, namely, detailed routing. Finally, in the detailed routing stage, the system creates the exact path and the specific shapes for each wire. Note that all of the design rules are typically used in this stage to ensure that the routed wires do not violate any of the design rules.

Routing is typically performed at multiple steps in the circuit design flow. For example, during floorplanning, global routing can be performed to check if a given floorplan is expected to cause routing congestion during the actual routing step in the circuit design flow (the global routing used during floorplanning can be approximate, i.e., it may not be as accurate as the global routing step that is used during the actual routing step). The circuit blocks can be abstracted out to hide unnecessary details, thereby speeding up the routing process. Specifically, the floorplanning tool can represent macros and standard cells as blocks. Each macro and standard cell typically has multiple pins which need to be electrically connected together based on their net assignments.

The global routing solution (i.e., the output of the global routing process) can then be used to determine whether or not routing congestion is expected to occur when the pins of the circuit blocks are electrically connected using wires. If the global routing solution indicates that congestion is likely to occur in one or more regions of the circuit design, then the user can use the floorplanning tool to resize and or move blocks/hard macros/partitions to alleviate routing congestion. Global routing based congestion analysis has been used in this disclosure for illustration purposes only, and is not intended to restrict the scope of the embodiments described herein. Other techniques can also be used to determine congestion, e.g., placement based statistical models, virtual routing based techniques, etc.

Regardless of the technique that is used for determining congestion, conventional approaches determine the congestion for a modified floorplan by processing the modified floorplan in essentially the same way they processed the initial floorplan. As a result, in conventional approaches, the process of resizing one or more channels to make the floorplan congestion free involves multiple time consuming iterations of resizing or moving blocks/hard macros/partitions, and performing a full blown congestion computation on the modified floorplan (e.g., by determining an updated global routing solution for the modified floorplan) to determine whether or not the modified floorplan is congestion free.

In contrast to conventional approaches, some embodiments described herein provide a substantially instantaneous feedback to the user about whether or not the modifications to the floorplan resolve the congestion problem. Specifically, some embodiments described herein provide the substantially instantaneous feedback partly because these embodiments do not perform global routing (or a similar resource intensive process) on the modified floorplan to determine the impact the modification has on congestion.

Figure 2A:
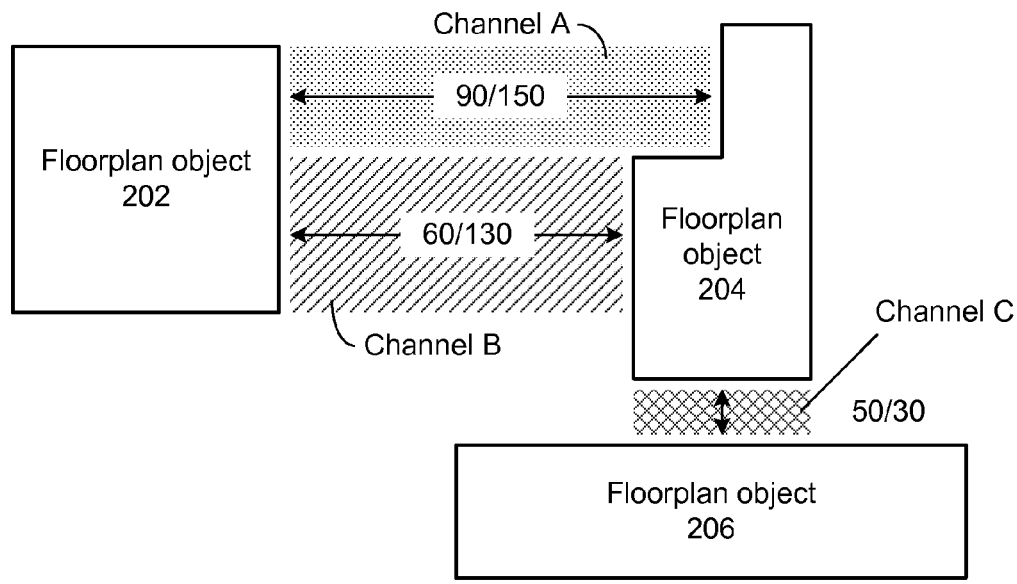
FIGS. 2A-2C illustrate examples of how a substantially instantaneous feedback about routing congestion can be provided in a GUI in accordance with some embodiments described herein.
Figure 2B:
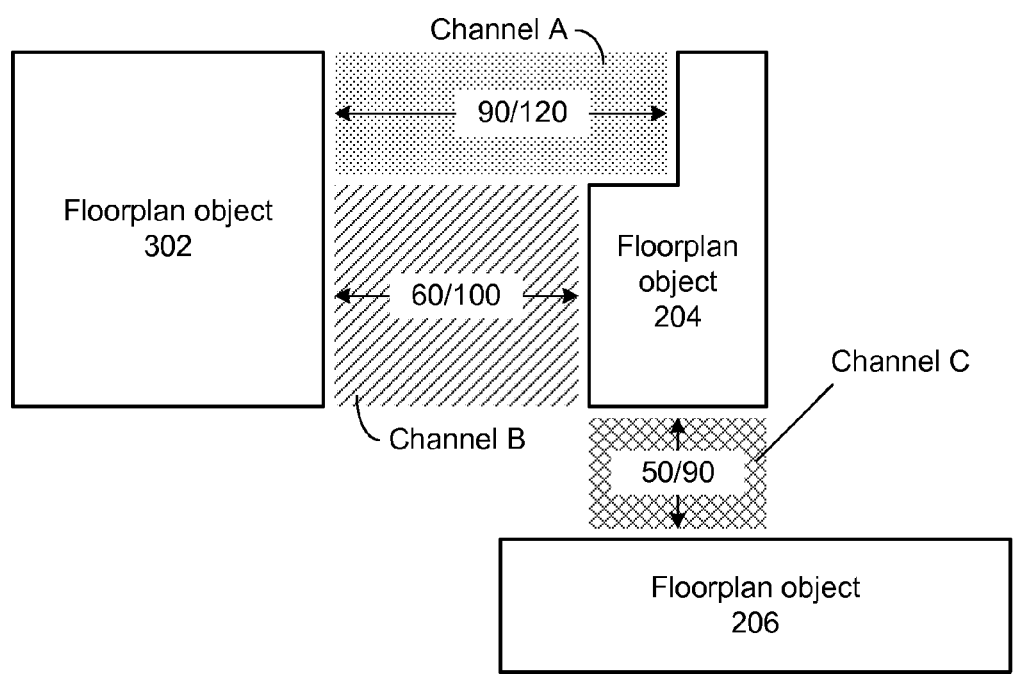
Figure 2C:
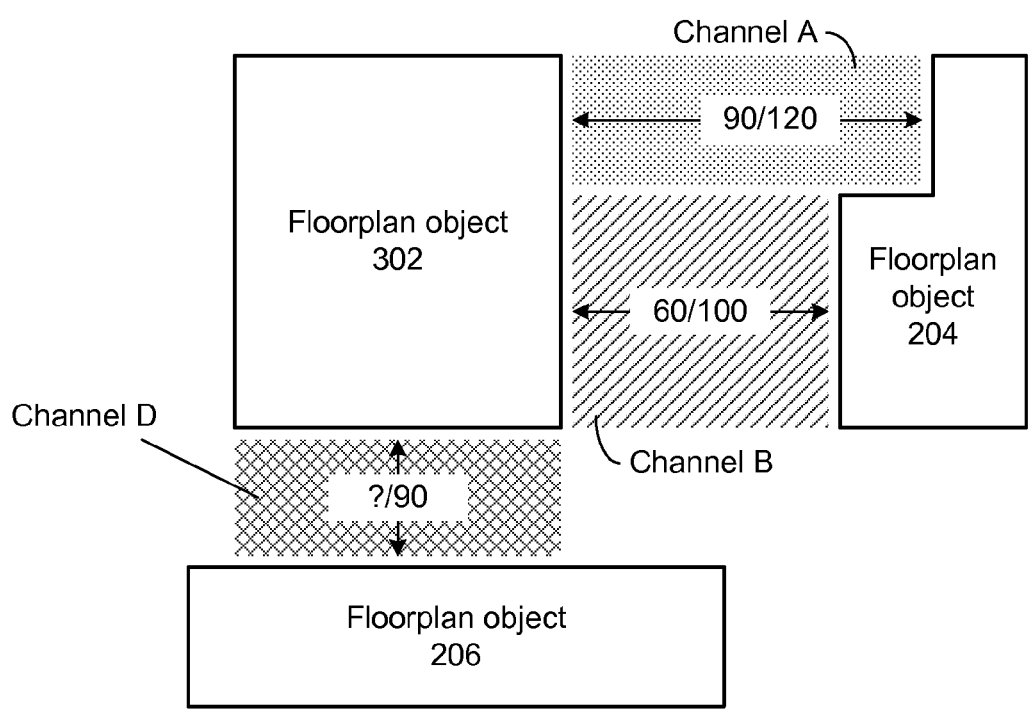

FIGS. 2A-2C illustrate examples of how a substantially instantaneous feedback about routing congestion can be provided in a GUI in accordance with some embodiments described herein. In FIG. 2A, channels A and B represent routing resources that exist between floorplan objects 202 and 204. Channels A and B can be used for routing wires in the vertical direction in FIG. 2A. Likewise, channel C exists between floorplan objects 204 and 206, and can be used for routing wires in the horizontal direction.

The floorplan shown in FIG. 2A can be provided to a global routing tool, and the result of global routing can be used to determine the demands and capacities of channels A, B, and C. The demand value of a channel can represent the number of wires that are expected to be routed through the channel, and the capacity value can represent the number of wires that can be routed through the channel. It will be apparent to those skilled in the art that the demand and the capacity values can be represented in other units.

The demands and capacities for each channel can be used to determine a congestion indicator that can be shown in the GUI. In some embodiments, the ratio between the demand and the capacity values for a channel can be shown as a ratio in the GUI. For example, FIG. 2A illustrates that the demand and capacity values for channel A are 90 and 150, respectively. These values can be used to generate the congestion indicator "90/150" which is shown in the GUI. Likewise, the congestion indicators for channels B and C are "60/130" and "50/30," respectively. The double-sided arrow in each channel illustrates the direction in which the channel width is measured. The congestion indicators shown in FIGS. 2A-2C are for illustration purposes only and are not intended to limit the scope of the embodiments disclosed herein. In general, a congestion indicator can be any indicator that visually represents the extent of congestion in a channel. In some embodiments, the congestion of a channel can be color coded, e.g., the color green can correspond to low congestion, the color yellow to medium congestion, and the color red to high congestion.

If the congestion indicator for a channel is greater than a threshold value (e.g., 1.0 or 0.9, etc.), then the user may decide to resize and/or move one or more floorplan objects to alleviate the congestion. For example, in FIG. 2A, the congestion indicators for channels A and B indicate that these channels are not congested. However, the congestion indicator for channel C indicates that this channel is congested.

To relieve congestion in the floorplan, the user may resize and/or modify floorplan objects. In response to detecting one or more modifications to the floorplan, some embodiments described herein update the congestion indicators substantially instantaneously so that the user can immediately see the effect that the user's modifications have had on routing congestion. FIG. 2B illustrates how the congestion indicators for channels can be updated substantially instantaneously. As shown in FIG. 2B, the user increased the size of floorplan object 202, moved floorplan object 204 up (which increased the width of channel C) and to the left (which reduced the width of channel B). Note that the demand values are the same in FIGS. 2A and 2B because resizing and/or moving floorplan objects does not change the demand. On the other hand, the capacity increases when the width of the channel increases, and decreases when the width of the channel decreases. For example, the capacity of channel A decreased from 150 to 120, the capacity of channel B decreased from 130 to 100, and the capacity of channel C increased from 30 to 90.

Some embodiments change the channel capacity based on the ratio of the original channel width and the new channel width. For example, if the original channel width is 20 units, and the new channel width is 15 units, then the original channel capacity can be multiplied by 15/20=3/4 to obtain the new channel capacity. Conversely, if the original channel width is 15 units, and the new channel width is 20 units, then the original channel capacity can be multiplied by 20/15=4/3 to obtain the new channel capacity.

FIG. 2C illustrates an example where moving a floorplan object can eliminate an existing channel and create a new channel. As shown in FIG. 2C, floorplan object 206 has been moved to the left beyond the leftmost edge of floorplan object 204. As a result, channel C no longer exists, and is therefore removed in the GUI. However, a new channel—channel D—has been created between floorplan objects 302 and 206. The channel capacity for channel D can be computed based on the channel width. However, the demand on channel D can be substantially different from the demand that was present on channel C (e.g., because it is incorrect to assume that all of the wires that were being routed through channel C would be routed through channel D). Therefore, some embodiments described herein mark the demand of a newly created channel as unknown, and accordingly display a congestion indicator in the GUI. For example, the congestion indicator "?/90" can be shown for channel D, where the "?" symbol indicates that the demand for the channel is unknown. A newly created channel may also be assigned a color that indicates that the demand for the channel is unknown.

Figure 2D:
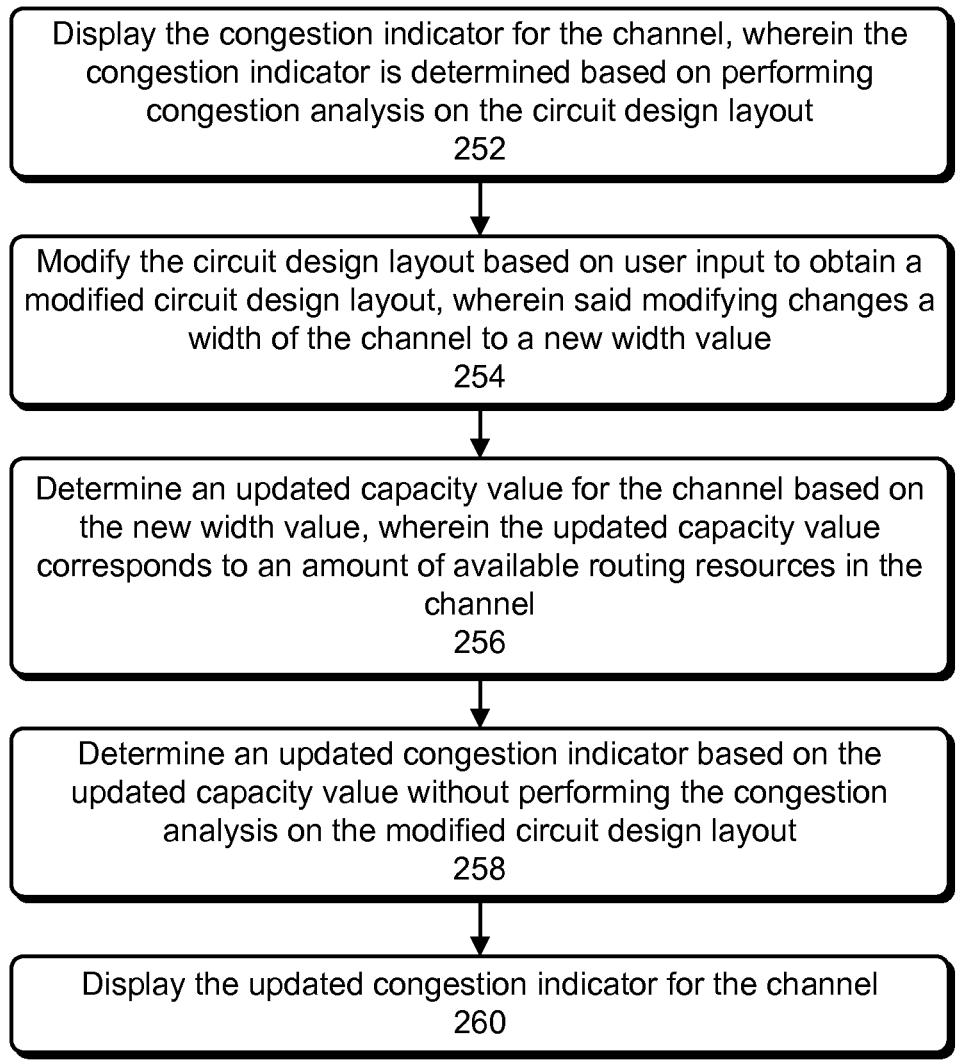
FIG. 2D presents a flowchart that illustrates a process for displaying a congestion indicator in accordance with some embodiments described herein.

FIG. 2D presents a flowchart that illustrates a process for displaying a congestion indicator in accordance with some embodiments described herein. The process can begin with an embodiment displaying the congestion indicator for the channel in a GUI, wherein the congestion indicator is determined based on performing congestion analysis on the circuit design layout (operation 252), e.g., by performing global routing on the entire circuit design layout. Next, the embodiment can modify the circuit design layout based on user input to obtain a modified circuit design layout, wherein said modifying changes a width of the channel to a new width value (operation 254). Note that a change in the channel length does not alter the channel capacity, but a change in the channel width does alter the channel capacity. The embodiment can then determine an updated capacity value for the channel based on the new width value, wherein the updated capacity value corresponds to an amount of available routing resources in the channel (operation 256). Next, the embodiment can determine an updated congestion indicator based on the updated capacity value without performing the congestion analysis on the modified circuit design layout (operation 258), e.g., without performing global routing on the entire modified circuit design layout. The embodiment can then display the updated congestion indicator for the channel in the GUI (operation 260).

Instantaneous Pin-Updates

Pin assignment refers to the process of assigning pin locations to a partition or a block in the circuit design. A partition is a portion of the circuit design (a partition typically includes the details of the cells that are within the partition). A partition is not associated with a physical area in the chip, and the GUI of a floorplanning tool does not treat a partition as a floorplan object that can be placed in the floorplan. A block, on the other hand, is a physical area in the circuit design layout that includes a portion of the circuit design. A GUI of a floorplanning tool can treat a block as a floorplan object that can be placed, and the GUI can be used to perform various operations (e.g., moving, sizing, changing the shape) on the block.

Pin assignment can be performed on a partition or a block. The pins on the boundaries of a partition or a block are electrically connected to one or more cells within the block, and an output of a cell in the partition or the block that needs to be electrically connected to an input of another cell in another partition or block must pass through a pin in the partition or block.

An original set of pin locations for a partition or a block can be determined by performing global routing on the circuit design layout, and then creating pins at locations where wires in the global routing solution cross boundaries of the partition or the block. In conventional approaches, when the circuit design layout changes (e.g., when a partition or block is resized or the shape is changed), global routing is performed on the modified circuit design layout, and new pin locations are determined based on the new routing solution. Performing global routing on the modified circuit design layout can take a long time, and therefore conventional approaches are unable to substantially instantaneously update the pin locations after the user makes changes to the circuit design layout.

Figure 3A:
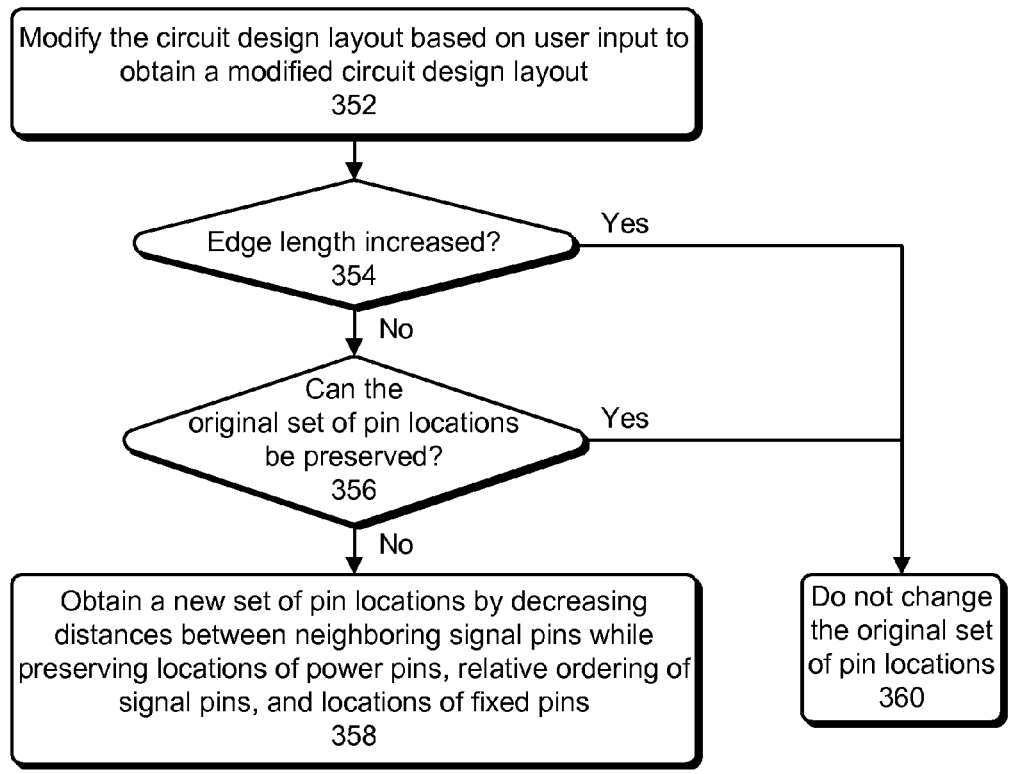
FIG. 3A presents a flowchart that illustrates a process for updating pin locations in a GUI in accordance with some embodiments described herein.

Some embodiments described herein substantially instantaneously update the pin locations of a partition or a block when a circuit design layout is modified (e.g., when a user uses the GUI to resize or change the shape of a partition or a block). In general, embodiments described herein try to minimize the amount by which pins are moved. Specifically, FIG. 3A presents a flowchart that illustrates a process for updating pin locations in a GUI in accordance with some embodiments described herein. The process begins with modifying the circuit design layout based on user input to obtain a modified circuit design layout (operation 352). If the length of an edge has increased ("Yes" branch of operation 354), then the original pin locations are not changed (operation 360). On the other hand, if the length of the edge has decreased ("No" branch of operation 354), then the embodiment can check if the original set of pin locations can be preserved (operation 356). If so ("Yes" branch of operation 356), then the original pin locations are not changed (operation 360). If the original pin locations cannot be preserved ("No" branch of operation 356), then a new set of pin locations is obtained by decreasing distances between neighboring data signal pins while preserving locations of power pins, relative ordering of data signal pins, and locations of fixed pins (operation 358).

In some embodiments, the distances between neighboring signal pins is decreased in proportion to the original distance between the signal pins. In other embodiments, first the distance between the neighboring signal pins near the endpoints of the edge (whose length was modified) are decreased, and if that is not sufficient, then the distances between neighboring signal pins near the center of the edge are decreased. During this process the order of signal pins is preserved. Certain types of pins are not moved even when the length an edge decreases. Specifically, power and ground pins and other pins that have been flagged as being fixed are not moved. If the fixed pin is a signal pin, then signal pins on either side of the fixed signal pin are moved without violating the order of the signal pins. Once the new set of pin locations has been determined, the new set of pin locations can be displayed in the GUI. Note that the above-described embodiment does not perform global routing on the modified circuit design layout to determine the new set of pin locations. If an edge decreases so much that the fixed pin location is no longer on the edge, then the fixed pin can be removed, and the user may be alerted of this fact so that the user can manually place the fixed pin in an appropriate location. If an edge decreases so much that the pins cannot be accommodated in the decreased edge size, then a warning can be issued to alert the user that the edge can no longer accommodate the pins. In this scenario, the pins are placed on the edge, but the pins may overlap with one another since they cannot be accommodated in the decreased edge size.

FIGS. 3B-3G illustrate how pin locations can be substantially instantaneously updated when the circuit design layout is modified in accordance with some embodiments described herein.

Figure 3B:
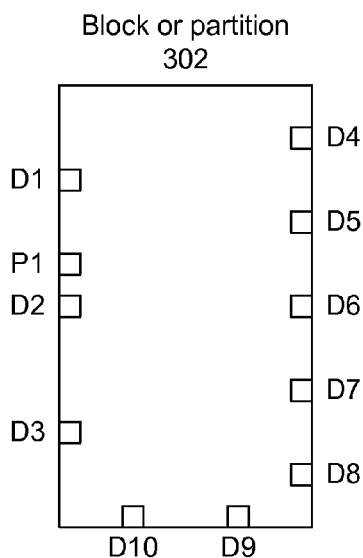
FIGS. 3B-3G illustrate how pin locations can be substantially instantaneously updated when the circuit design layout is modified in accordance with some embodiments described herein.
Figure 3C:
Figure 3C:
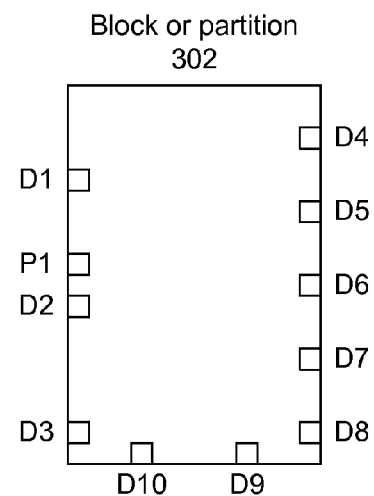

FIG. 3B illustrates block or partition 302 with signal pins D1-D10, and power/ground pin P1. The pin locations shown in FIG. 3B can be the original set of pin locations that were, for example, determined by performing global routing on the circuit design, and identifying the locations where the wires crossed the boundaries of block or partition 302. Signal pins can carry data, address, and/or control signals. Power/ground pins provide power to the circuitry within block or partition 302. One or more pins (either signal pins and/or power/ground pins) may be identified as being fixed by the user or by an EDA tool. FIG. 3C illustrates block or partition 302 after performing a resizing operation that decreased the lengths of the left and right edges (the bottom edge of block or partition 302 was moved up). Note that the locations of pins P1 and D1-D3 were not changed because those pin locations could be accommodated in the decreased edge length. In some embodiments, the distance between neighboring signal pins on the right edge (i.e., pins D4-D8) is decreased in proportion with the original distances, i.e., if the original length of the edge was L1, the decreased length is L2, and the distance between two neighboring pins was L3, then the new distance between those two pins can be L4=L3×L2/L1. This embodiment is illustrated in FIG. 3C. In other embodiments, a signal pin is moved only if it needs to be moved. For example, in some embodiments, only signal pin D8 may be moved up, but the locations of signal pins D4-D7 may be preserved. Since the bottom edge did not change in length, the locations of signal pins D9 and D10 on the bottom edge remained unchanged.

Figure 3D:
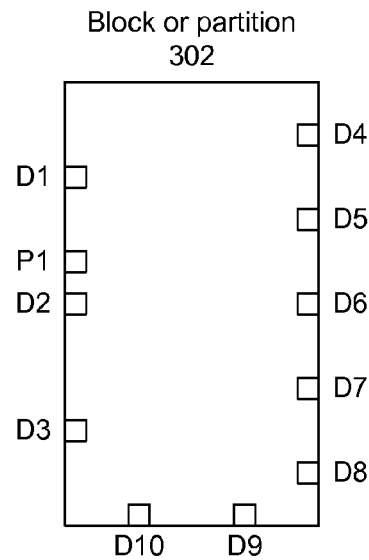
Figure 3E:
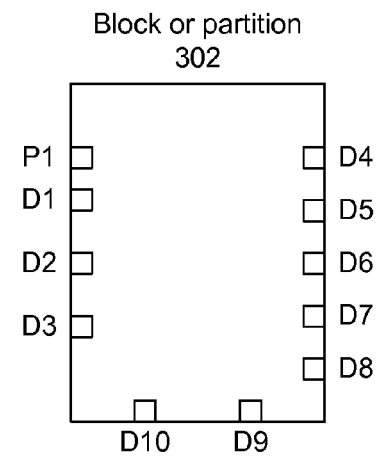

FIG. 3D is the same as FIG. 3B. FIG. 3E illustrates block or partition 302 after performing a resizing operation that decreased the lengths of the left and right edges (the top edge of block or partition 302 was moved down).

In this example, the signal pins on both the right and the left edge were moved as shown in FIG. 3E. Note that power/ground pin P1 was not moved, and that changed the relative order of the pins on the left edge (power/ground pin P1 is between signal pins D1 and D2 in FIG. 3D, but it is not between those two signal pins in FIG. 3E). However, the relative order between the signal pins D1-D3 was maintained on the left edge of block or partition 302. Preserving the order of signal pins is important to avoid problems during routing (if the order of signal pins is not preserved, the wires that are electrically connected to the signal pins may need to be crossed over which may be problematic during routing).

Figure 3F:
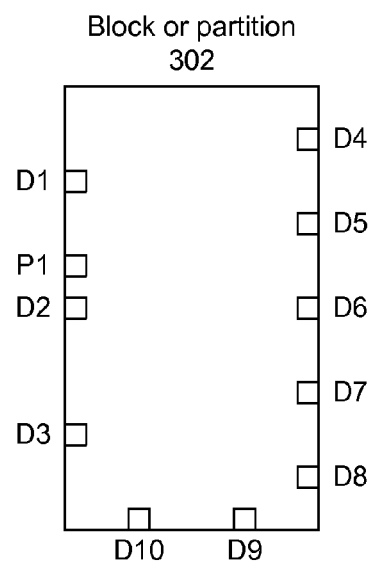
Figure 3G:
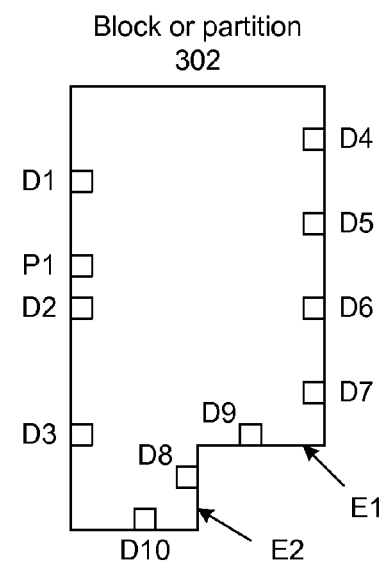

FIG. 3F is the same as FIG. 3B. FIG. 3G illustrates block or partition 302 after changing the shape of block or partition 302. Specifically, the bottom right corner of block or partition 302 was cut in. In this example, some of the signal pins on the bottom and right edge were moved as shown in FIG. 3G. Power/ground pin P1 and signal pins D1-D3 on the left edge were not moved. Likewise, signal pins D4-D7 on the right edge and signal pin D10 on the bottom edge were not moved. Signal pin D9 that was on the bottom edge was moved to edge E1, and signal pin D8 that was on the right edge was moved to edge E2. When new edges (e.g., edges E1 and E2) are added to a block or partition, the pins on an edge having a given orientation are moved to a new edge with the same orientation. For example, if a pin (e.g., pin D9) is on a horizontal edge (e.g., the bottom edge), then the pin is moved to the new horizontal edge (e.g., edge E1) after the shape is changed. Likewise, if a pin (e.g., pin D8) is on a vertical edge (e.g., the right edge), then the pin is moved to the new vertical edge (e.g., edge E2). Note that the relative order of the signal pins is preserved in FIG. 3G if we only consider the pins on horizontal edges or only consider the pins on the vertical edges. However, if we perform an edge traversal around block or partition 302 in FIG. 3G, then the order of signal pins has not been preserved. Specifically, if we perform a clockwise edge traversal from the top right corner to the bottom left corner of block or partition 302, then the order of signal pins is different in FIGS. 3F and 3G.

Once the new pin locations have been determined, the new pin locations can be snapped to wire track locations in the circuit design layout. For example, if the new pin location is at location 2.42 (the pin locations can be represented by the distance in length units from a reference point on the edge), and the nearest wire track is at allocation 2.4, then the new pin location can be snapped (i.e., changed) from 2.42 to 2.4. In some embodiments, if two or more pins snapped to the same wire track location, the embodiment can assign a pin location for each of the two or more pins in a different metal layer. For example, if two pin locations snap to location 2.4, then one pin location can be assigned to metal layer M1 and the other pin location can be assigned to metal layer M2.

Hierarchical View

Figure 4A:
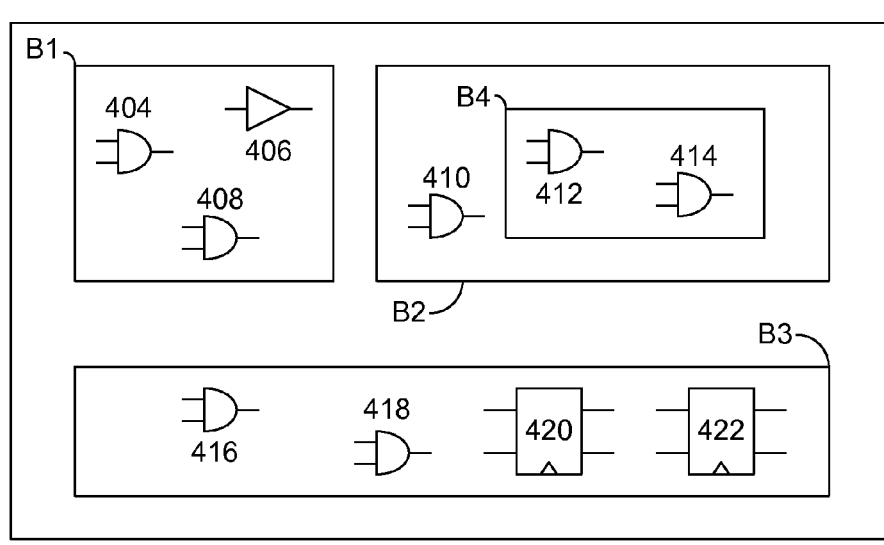
FIG. 4A illustrates how a GUI can enable a user to view the logical hierarchy of a circuit design in accordance with some embodiments described herein.

A circuit design has a logical hierarchy that can be, for example, defined by the HDL code for the circuit design. For example, the HDL code may specify that a processing block includes a multiplier block and an adder block, and the multiplier and adder blocks in turn include other blocks within them. The GUI of a floorplanning tool can enable a user to view the circuit design according to the logical hierarchy. FIG. 4A illustrates how a GUI can enable a user to view the logical hierarchy of a circuit design in accordance with some embodiments described herein. View 400 includes blocks B1-B4. Block B1 includes circuit elements 404-408 and block B3 includes circuit elements 416-422. Block B2 includes circuit element 410 and block B4 which includes circuit elements 412-414. For the sake of clarity, the nets that electrically connect pins of different circuit elements have not been shown in FIGS. 4A-4C.

A circuit design can have multiple voltage domains, multiple power domains, and/or multiple clock domains. Specifically, each circuit element in the circuit design can be associated with a particular voltage, power, and/or clock domain. In general, each circuit element can be associated with one or more attribute values corresponding to one or more attribute types. Voltage domain, power domain, and clock domain are examples of attribute types. A particular voltage domain identifier that corresponds to a particular voltage domain, a particular power domain identifier that corresponds to a particular power domain, or a particular clock domain identifier that corresponds to a particular clock domain are examples of an attribute value that correspond to an attribute type.

Sometimes it is useful to view a circuit design by grouping circuit elements based on a particular attribute type (e.g., grouped based on voltage, power, or clock domains). Some embodiments described herein enable a circuit designer to view the circuit design based on one or more attribute types. For example, the user may want to view the circuit design in terms of the voltage, power, or clock domains (i.e., instead of, or in addition to, viewing the circuit design based on the logical hierarchy).

Some attributes can be hierarchical. Specifically, voltage, power, and clock domains can be hierarchical. For example, a first power domain can be considered to be within a second power domain's hierarchy if the first power domain is always off whenever the second power domain is off. When a circuit design view is generated based on a given attribute, the attribute hierarchy in the circuit design can become visually apparent. Viewing a circuit design in which circuit elements are grouped based on an attribute type can enable user to understand the interrelationships between circuit elements in the circuit design in new ways, thereby facilitating the user to design and debug circuit designs.

Figure 4B:
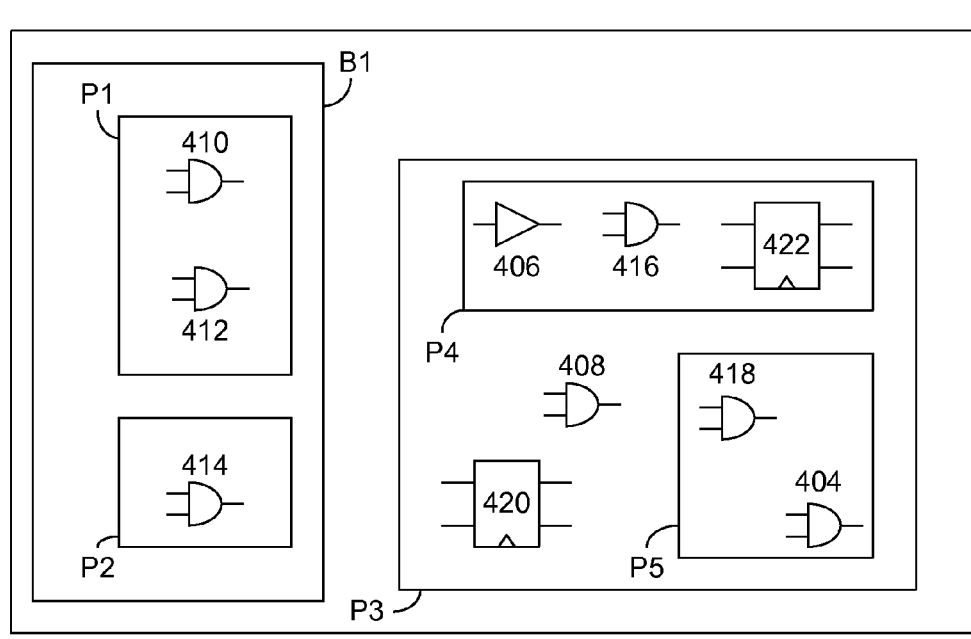
FIG. 4B presents a view based on a power domain hierarchy in accordance with some embodiments described herein.

FIG. 4B presents a view based on a power domain hierarchy in accordance with some embodiments described herein. View 430 includes the same circuit elements that were displayed in view 400, but they are now grouped based on their power domains. Specifically, circuit elements 410-412 are in power domain P1, i.e., circuit elements 410-412 are associated with attribute value P1 corresponding to the power domain attribute type. Likewise, circuit element 414 is in power domain P2, circuit elements 406, 416, and 422 are in power domain P4, circuit elements 418, 404 are in power domain P5, and circuit elements 408 and 420 are in power domain P3. Further, view 430 illustrates a power domain hierarchy in which power domains P4 and P5 are within power domain P3.

A view can display the other attribute values associated with each circuit element. Further, a view can group circuit elements based on multiple attributes and display those groupings simultaneously. For example, view 430 shows that power domains P1 and P2 (which group circuit elements based on their power domains) are within block B1 (which groups circuit elements based on the logical hierarchy as shown in FIG. 4A).

FIG. 4C presents a view based on a clock domain hierarchy in accordance with some embodiments described herein. View 440 includes the same circuit elements that were displayed in view 400, but they are now grouped based on their clock domains. A clock domain can generally be defined as a portion of the circuit design that is driven by either a single clock or a set of clocks that have a fixed phase and frequency relationship between them. For example, two clocks of the same frequency that have a constant phase difference can be considered to be within the same clock domain. Likewise, two clocks that have a fixed frequency relationship (e.g., one clock has half the frequency of the other clock) and also a fixed phase difference can also be considered to belong to the same clock domain. Specifically, circuit elements 410, 416, 420 are in clock domain C1, i.e., circuit elements 410, 416, 420 are associated with attribute value C1 corresponding to the clock domain attribute type. Likewise, circuit elements 404, 406, 408, 412, 414, 418, and 422 are in clock domain C2.

FIG. 4D presents a flowchart that illustrates a process for displaying a circuit design in a GUI in accordance with some embodiments described herein. The process can begin by displaying a first view of a circuit design in the GUI, wherein the first view groups circuit elements into hierarchical blocks in accordance with a logical hierarchy of the circuit design, and wherein at least some circuit elements in the circuit design are associated with one or more attribute values corresponding to one or more attribute types (operation 452). Next, a request to display the circuit design based on an attribute type (e.g., voltage, power, or clock domain)

can be received, and responsive to receiving the request to display the circuit design based on the attribute type, the embodiment can generate a second view of the circuit design, wherein the second view groups circuit elements into blocks that have the same attribute value for the attribute type (operation 454). The embodiment can then display the second view of the circuit design in the GUI (operation 456).

For example, the first view can correspond to FIG. 4A. If the attribute type is power domain, then generating the second view can involve assigning each circuit element to a block based on the power domain of the circuit element. The second view can correspond to FIG. 4B. As shown in FIG. 4B, the blocks in the second view can have a hierarchical structure that corresponds to a power domain hierarchy. If the attribute type is clock domain, generating the second view can involve assigning each circuit element to a block based on the clock domain of the circuit element. In this case, the second view can correspond to FIG. 4C.

Computer System

Figure 5:
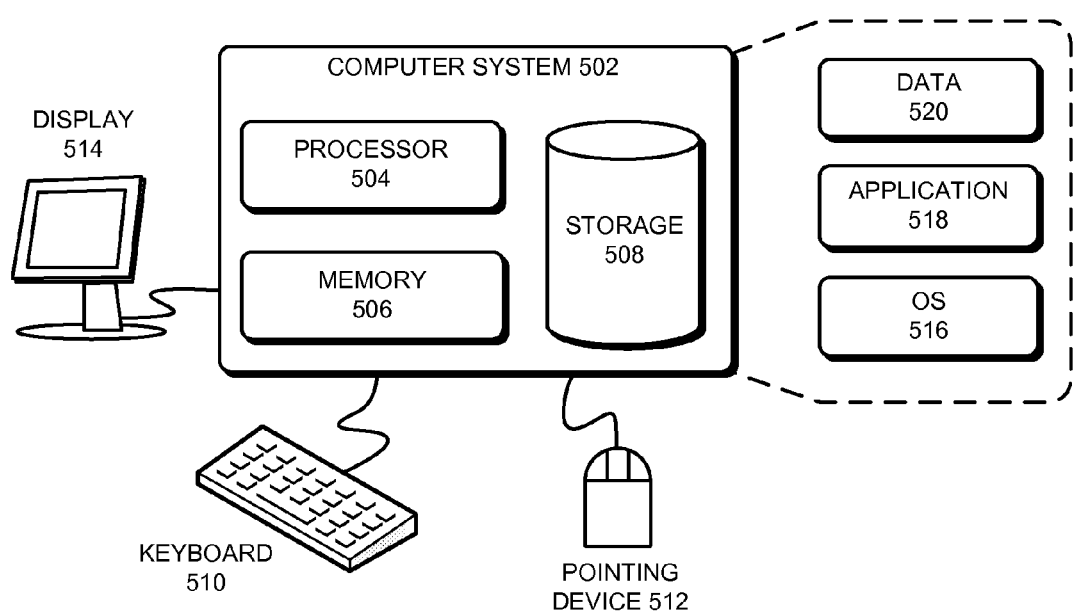
FIG. 5 illustrates a computer system in accordance with some embodiments described in this disclosure.

FIG. 5 illustrates a computer system in accordance with some embodiments described in this disclosure. Computer system 502 can include processor 504, memory 506, and storage device 508. Computer system 502 can be coupled to display device 514 (which may or may not be capable of detecting the presence, location, and/or movement of a touch within the display area), keyboard 510, and pointing device 512. Storage device 508 can store operating system 516, application 518, and data 520. Data 520 can include input required by application 518 and/or output generated by application 518.

Computer system 502 may perform one or more operations (either automatically or with user input) in any method that is implicitly or explicitly described in this disclosure. For example, during operation, computer system 502 can load application 518 into memory 506. Application 518 can then be used by a user to create, view, and/or edit a floorplan for a circuit design.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) tool in a computer, a method to determine a user-specified location in a circuit design layout for performing a circuit design operation, wherein the circuit design layout is displayed in a graphical user interface (GUI) of the EDA tool, the method comprising:
   receiving a first user input, wherein the first user input selects a first point in the GUI associated with a first graphical object in the circuit design layout as a first inference point;
   receiving a second user input, wherein the second user input selects a second point in the GUI associated with a second graphical object in the circuit design layout as a second inference point;
   displaying a third inference point in the GUI, wherein the third inference point is located at an intersection of a first line that extends from the first inference point and a second line that extends from the second inference point; and
   determining the user-specified location for performing the circuit design operation based on the third inference point in the GUI.

2. The method of claim 1, wherein determining the user-specified location for performing the circuit design operation comprises receiving a third user input that selects the third inference point as the user-specified location for performing the circuit design operation in the GUI.

3. The method of claim 1, wherein determining the user-specified location for performing the circuit design operation comprises determining a location that is at a user-specified offset from the third inference point in the GUI.

4. The method of claim 1, wherein determining the user-specified location for performing the circuit design operation comprises determining an intersection of a third line that extends from the third inference point and a fourth line that extends from a fourth inference point in the GUI.

5. The method of claim 1, wherein the circuit design operation creates a vertex of a polygon at the user-specified location in the GUI.

6. The method of claim 1, wherein the circuit design operation positions an existing graphical object at the user-specified location in the GUI.

7. A non-transitory computer-readable storage medium storing instructions for an electronic design automation (EDA) tool that, when executed by a computer, cause the computer to perform a method to determine a user-specified location in a circuit design layout for performing a circuit design operation, wherein the circuit design layout is displayed in a graphical user interface (GUI) of the EDA tool, the method comprising:

receiving a first user input, wherein the first user input selects a first point in the GUI associated with a first graphical object in the circuit design layout as a first inference point;

receiving a second user input, wherein the second user input selects a second point in the GUI associated with a second graphical object in the circuit design layout as a second inference point;

displaying a third inference point in the GUI, wherein the third inference point is located at an intersection of a first line that extends from the first inference point and a second line that extends from the second inference point; and determining the user-specified location for performing the circuit design operation based on the third inference point in the GUI.

8. The non-transitory computer-readable storage medium of claim 7, wherein determining the user-specified location for performing the circuit design operation comprises receiving a third user input that selects the third inference point as the user-specified location for performing the circuit design operation in the GUI.

9. The non-transitory computer-readable storage medium of claim 7, wherein determining the user-specified location for performing the circuit design operation comprises determining a location that is at a user-specified offset from the third inference point in the GUI.

10. The non-transitory computer-readable storage medium of claim 7, wherein determining the user-specified location for performing the circuit design operation comprises determining an intersection of a third line that extends from the third inference point and a fourth line that extends from a fourth inference point in the GUI.

11. The non-transitory computer-readable storage medium of claim 7, wherein the circuit design operation creates a vertex of a polygon at the user-specified location in the GUI.

12. The non-transitory computer-readable storage medium of claim 7, wherein the circuit design operation positions an existing graphical object at the user-specified location in the GUI.

13. An apparatus, comprising:
a processor; and
a non-transitory computer-readable storage medium storing instructions for an electronic design automation (EDA) tool that, when executed by the processor, cause the apparatus to perform a method to determine a user-specified location in a circuit design layout for performing a circuit design operation, wherein the circuit design layout is displayed in a graphical user interface (GUI) of the EDA tool, the method comprising:

receiving a first user input, wherein the first user input selects a first point in the GUI associated with a first graphical object in the circuit design layout as a first inference point;

receiving a second user input, wherein the second user input selects a second point in the GUI associated with a second graphical object in the circuit design layout as a second inference point;

displaying a third inference point in the GUI, wherein the third inference point is located at an intersection of a first line that extends from the first inference point and a second line that extends from the second inference point; and determining the user-specified location for performing the circuit design operation based on the third inference point in the GUI.

14. The apparatus of claim 13, wherein determining the user-specified location for performing the circuit design operation comprises receiving a third user input that selects the third inference point as the user-specified location for performing the circuit design operation in the GUI.

15. The apparatus of claim 13, wherein determining the user-specified location for performing the circuit design operation comprises determining a location that is at a user-specified offset from the third inference point in the GUI.

16. The apparatus of claim 13, wherein determining the user-specified location for performing the circuit design operation comprises determining an intersection of a third line that extends from the third inference point and a fourth line that extends from a fourth inference point in the GUI.

17. The apparatus of claim 13, wherein the circuit design operation creates a vertex of a polygon at the user-specified location in the GUI.

18. The apparatus of claim 13, wherein the circuit design operation positions an existing graphical object at the user-specified location in the GUI.

* * * * *